May 20, 1941.  P. H. IRMISCHER  2,242,303
SWIVEL JOINT
Filed Nov. 24, 1939
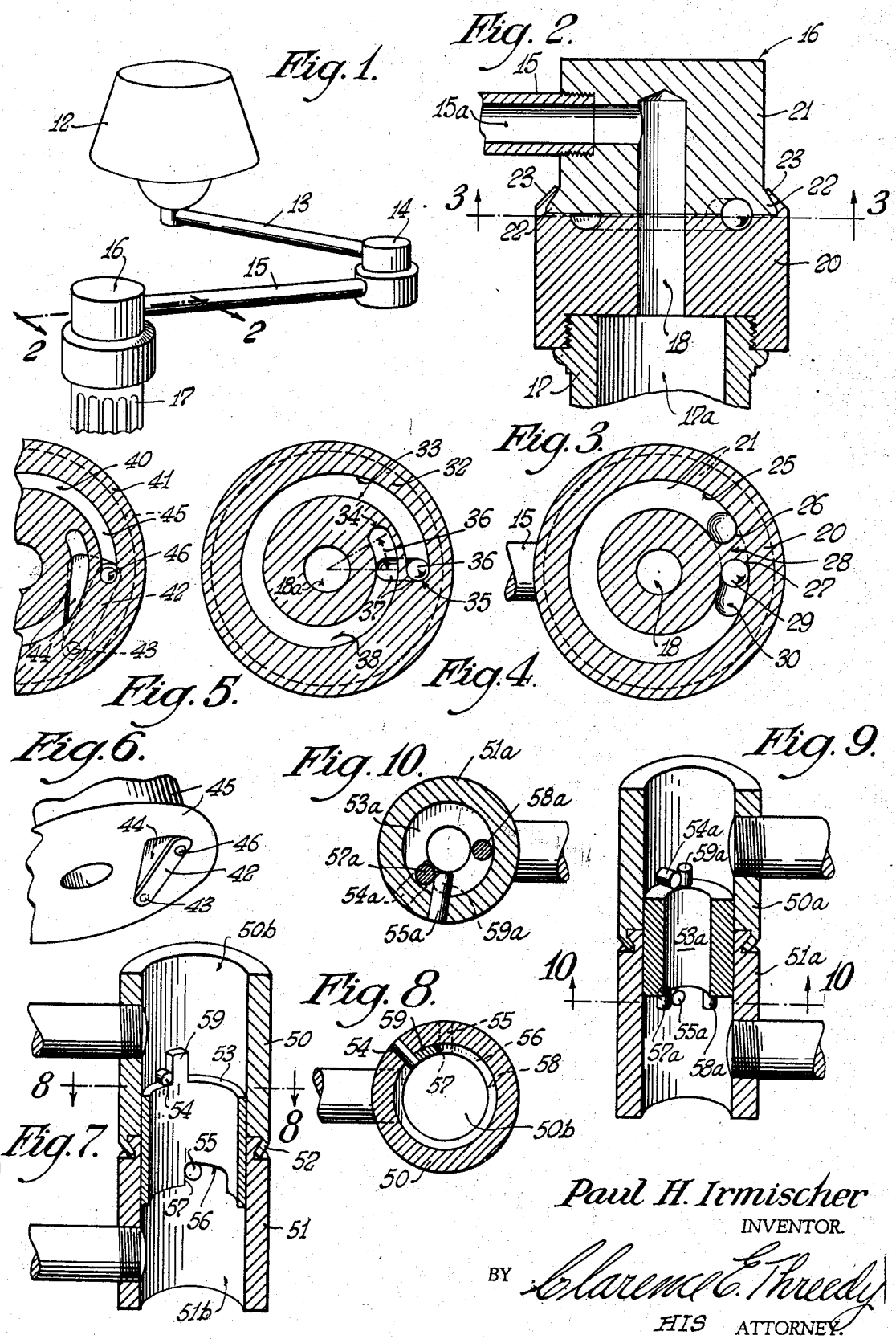
Paul H. Irmischer
INVENTOR.
BY Clarence E. Threedy
HIS ATTORNEY.

Patented May 20, 1941

2,242,303

UNITED STATES PATENT OFFICE 2,242,303

SWIVEL JOINT

Paul H. Irmischer, Chicago, Ill.

Application November 24, 1939, Serial No. 305,801

6 Claims. (Cl. 285—97.7)

This invention relates to swivel joints for lamp brackets and the like and has as its principal object the provision of improved stop means for limiting the turning movement of the joint members to prevent injury to the electric wiring where the joint is employed in an electric lamp.

A further object is the provision of improved stop means arranged to permit the swivel joints to be turned more than one complete revolution so as to provide an amount of override, thus rendering the lamp or other fixture more flexible while at the same time preventing injury to the conductors.

Viewed from another aspect, it is an object of the invention to provide a swivel joint including a pair of relatively rotatable swivel members with a movable stop element interposed between the same, and coacting stop means on the swivel members so arranged that by turning one of the members with respect to the other in either direction, the movable stop element will be positioned for stopping engagement with the stop means on one or the other of the swivel members to arrest the turning movement after the swivel members have been turned a predetermined amount beyond 360 degrees.

Other objects, advantages and novel aspects of the invention reside in certain details of construction as well as the cooperative relationship of the component parts of the illustrative embodiment described hereinafter in view of the annexed drawing, in which:

Fig. 1 shows a perspective fragment of a bridge lamp;

Fig. 2 is an enlarged section along line 2—2 of Fig. 1 through one of the swivel joints, disclosing one type of stops means;

Fig. 3 is a horizontal section through the swivel joint of Fig. 2, looking up along line 3—3;

Fig. 4 is a horizontal sectional view taken through a modified form of stop means taken along a section line corresponding to line 3—3 of Fig. 2;

Fig. 5 is a fragmentary section of a modified form of stop means taken along a similar section line to Figs. 3 and 4;

Fig. 6 is a fragmentary perspective of the stop means of Fig. 5;

Fig. 7 is a vertical section through a modified construction of the swivel joint and stop means;

Fig. 8 is a cross section along line 8—8 of Fig. 7;

Fig. 9 is a vertical section through another modified form of swivel joint and stop means;

Fig. 10 is a cross section along line 10—10 of Fig. 9.

The improved swivel joint is intended for general application and has been successfully employed in lamps and similar fixtures in the manner illustrated, for example, in Fig. 1, wherein a lamp assembly 12 is mounted at one end of a bracket arm 13 connected by a swivel joint, generally indicated at 14, with another bracket arm 15 which in turn is attached by means of a second swivel joint, generally indicated at 16, to the head of a column or base post 17. In this type of bracket structure, the electric conductors (not shown) are carried up through the hollow portions 17a of the post and through a bore 18 in the swivel joint into the bore 15a, and on through the joint 14 and arm 13 for connection with the lamp 12.

It will be apparent that continued swinging of the bracket arms relative to the post 17 will eventually rupture the insulation and even the conductors in the type of wire usually employed in these devices, if the bracket arms are rotated through several revolutions in the same direction, it being obvious that this will twist the conductors and exert a pull upon the same resulting in the destruction of the insulation and the dangerous likelihood of fire due to short circuiting.

In order to prevent injury to the conductors, it has been the practice heretofore to provide a stop means to limit the swivel movement of the bracket arms 13 and 15 with respect to the post 17 so that the same cannot turn beyond 360 degrees or one complete revolution.

However, this arrangement has been found inconvenient in adjusting a lamp to accommodate some particular peculiarity of its location with respect to walls or other pieces of furniture, for it is frequently necessary to turn the base structure 17 of the lamp in order to dispose the same so that the bracket arms may be swung into the desired position.

It has been found that the electric conductors will not be injured if the bracket arms are permitted to swing beyond 360 degrees, it being merely necessary to prevent continued rotation of the swivel members beyond two or three turns.

The present invention provides a stop means which will permit the swivel joints to turn through more than one revolution and not more than a safe number, for example, two or three, beyond, thus obviating the prior inconvenience of having to turn the entire lamp structure or other fixture in order to adjust the arms for movement a short distance beyond the stopping point in a particular direction.

Apart from the foregoing advantages, the invention also provides a simplified joint construction with respect both to the stop means and means for joining the swivel members as a unit.

In the embodiment shown in Figs. 2 and 3, the swivel joint includes a lower swivel member 20 threaded upon the upper end of the column or post 17, and a companion swivel member 21 which is rotatably seated in the first member by the provision of a flare or flange portion 22 around the bottom periphery, said flare being gripped by turned-over or spun portions 23 around the top of the bottom joint member, the members 20 and 21 being free to turn with respect to each other. The central bore 18 extends through both joint members and communicates with the bore 15a in the bracket arm 15 which is threaded into the upper joint member 21.

The stop means (Fig. 3) includes the provision in the upper end or face of the lower swivel member 20 of a groove or track 25 which extends concentrically of the bore 18, and hence the pivotal axis of the swivel members, through a distance of less than 360 degrees, the terminal ends 26 and 27 of this groove constituting stop means on the lower swivel member 20, these terminal extremities being separated by a short intervening body portion 28 of the swivel member. The section of Fig. 3 has been taken in Fig. 2 along a line just below the upper face or end of the lower swivel member 20.

Disposed in the groove 25 is a movable stop element in the form of a bearing ball 29, while the companion or upper swivel member 21 is provided with a short groove or track 30 also extending concentrically of the turning axis of the joint members, so that the shorter groove overlies or is in alignment with the groove or track in the companion member, the ball or movable stop means 29 being disposed in both grooves and being adapted to run around the longer groove between the ends thereof as a result of the displacement of the shorter groove, upon turning of the swivel members. Attention is called to the fact that the shorter groove 30 is of a length at least sufficient to bridge the distance across the intervening body portion 28 between the terminals 26 and 27 of the main or longer groove.

In consequence of the foregoing structural arrangement of long and short grooves, it will be apparent that the ball 29 will be carried against one or the other terminals 26 or 27 when the companion swivel member is turned through nearly 360 degrees.

If the shorter groove 30 were no longer than the intervening body portion 28, the override beyond a complete or 360-degree turn would not be permitted; however, it will be observed in Fig. 3 that the slot 30 is of appreciably greater length than that of the intervening body portion 28 between the ends of the main groove, and therefore the companion swivel member will be permitted to turn beyond 360 degrees in correspondence to the length of the groove 30 as it exceeds the length of the intervening body portion 28 or, in other terms, the distance between the terminals 26 and 27. It will therefore be apparent that by lengthening the slot 30 the joint members may swing a considerable distance more than one revolution but less than two.

In Fig. 4 there is shown a modified form of stop means, the illustration being by way of a cross section similar to the section of Fig. 3, wherein the lower swivel joint 32 is provided with a spiral groove or track 33 which is evolved with respect to a center coinciding with the pivotal axis of the joint members through the bore portion 18a, the opposite terminals or ends 34 and 35 of which are displaced angularly with respect to said center by a length of arc indicated at 36 which corresponds to the length of override, as will be pointed out hereinafter. The terminals 34 and 35 constitute stop means on one of the joint members, the stop means on the other joint member 38 being in the nature of a radially extending slot 37 which is long enough to bridge the distance between the terminal 35 of the outermost convolution and the next adjacent convolution along a radius from the turning axis of the members.

Movable stop means in the nature of a bearing ball 39 is disposed in the spiral and the shorter radial groove 37 when the joint members are in assembled relation, and it will be apparent that when the swivel joints are turned one with respect to the other, the ball 39 will ride in the spiral groove and shift its position in the radial groove 37 as the rotative movement continues, and when a complete revolution has been made, the ball 39 will be at the opposite end of the short groove 37 from that shown in Fig. 4, the carry-over or override beyond a complete revolution of 360 degrees being effective in the remaining portion of the spiral groove between its terminal 34 and said inner or opposite end of the groove 37 as seen in Fig. 4. It will therefore be apparent that the spiral groove could be continued beyond its inner turn 34 with a corresponding lengthening of the groove 37 toward the center to provide a still greater override.

Another modification, analogous to the arrangement of Fig. 4 is shown in Fig. 5, wherein a spiral groove 40, in other respects similar to the groove 33 of Fig. 4, is provided in the lower swivel joint 41. In this arrangement, however, the movable stop means is in the nature of an arm 42 (Fig. 6 also) pivoted as at 43 in a slot 44 formed in the face of the upper joint member 45. Disposed eccentrically of its pivotal axis 43 on lever 42 is a stop formation in the preferred form of an embossed projection 46 which rides in the spiral groove 40 during rotative movement of the joint members and, as it works from the outer toward the inner convolutions, swings the arm 42 to the limit of its movement in slot 44, projection 46 constituting, as a part of structure 42—43, a movable stop means which, in other respects, acts analogously to the ball 39 in the device of Fig. 4 in shifting for engagement with the opposite terminals (or stop means) of the spiral groove.

In Fig. 7 there is shown a modified form of joint structure and stop means in which the upper and lower joint members 50 and 51 are tubular in form and are assembled as a unit for relative rotation by interengaging flare and spun portions 52 analogous to the formations 22—23 described in view of Fig. 2. Disposed within the aligned bore portions 50b and 51b of the joint members is a movable stop means in the nature of a tubular bushing 53 fitted loosely enough to turn relative to either joint member and maintained in the position shown by means of a pin 54 projecting inwardly from the upper swivel member opposite the upper edge of the bushing, and by means of a pin 55 projecting inwardly from the lower swivel member 51 and into a circumferentially extending notch 56 cut into the lower edge of the bushing.

The pins 54 and 55 constitute stop means on the respective swivel members, and the opposite terminal edge portions 57 and 58 of the notch constitute a stop means at the lower edge of the movable stop member, while the upper edge of the bushing is provided with an axially extending lug 59 adapted to engage the stop means or pin 54 to limit the turning movement of the bushing.

In the operation of the device of Fig. 7, it will be apparent that the upper swivel member 50 may be turned from a position in which the pin 54 is against the left side of the lug 59, as shown in Fig. 7, through nearly 360 degrees, to a position where the pin 54 will bear against the opposite side of the lug 59.

Assuming that the bushing or movable stop means 53 has not rotated from its position shown in Fig. 7 when the upper swivel member 50 is turned through nearly 360 degrees as aforesaid, it will be apparent that the pin 54 in striking the opposite side of lug 59 will tend to rotate the bushing responsive to continued turning of the swivel member in an effort to move it beyond 360 degrees, and such movement of the bushing will be permitted until the pin 55 engages the edge portion 58 of the slot to arrest further movement of the bushing.

It will be evident from an inspection of Fig. 7 that if the bushing 53 were fixed, the joint members would rotate through a distance equal to 360 degrees less the angular width of the lug 59 plus the diameter of the pin 54 (see Fig. 8 also). However, by making the slot 56 longer than the combined width across pin 54 and 59, allowing for the diameter of pin 55, the bushing and the lug 59 will not be fixed, and hence may move when pin 54 comes around to the opposite side of the lug, so that the swivel members will be turned through more than one revolution.

A modified form of the arrangement of Fig. 7 is shown in Fig. 9 wherein stop pins 54a and 55a, similar to pins 54 and 55 of Fig. 7, are similarly situated on swivel members 50a and 51a, and a tubular bushing 53a is disposed in the bores of both swivel members. However, in place of the lug 59 there is provided a pin 59a seated in the upper end of the bushing with a pair of circumferentially spaced pins 57a, 58a on opposite sides of the pin 55a on the lower side of the bushing. This arrangement operates in exactly the same manner as the device of Fig. 7.

In the claims appended hereto, the terms "swivel" or "joint" members include the relatively rotatable parts 20 and 21 of Fig. 2 and the corresponding parts 32 and 38 or 41 and 45 in Figs. 4 and 5, as well as the members 50 and 51 and 50a and 51a in Figs. 7 and 9. Where the term "rotatable" is used, it is intended to convey angular displacement either less than or greater than 360 degrees, while the terms "angular displacement or length" relate to the distance along an arc with respect to the center for said arc. Where the claims refer to a certain or predetermined distance or override, such distance is intended to be determined in the device of Fig. 3 by the angular length of the slot 30 in excess over the angular distance across the body portion 28 between the stop means afforded by the terminals 26 and 27 of the main slot 25. This override distance may be determined in conjunction with the embodiments of Figs. 4 and 5 by the angular distance in excess of the length of the inner convolution beyond the end 39 of the first convolution, assuming the short slot 37, of course, to communicate as far as the inner convolution. If the slot 37 be shortened, the override will be correspondingly shortened regardless of how far the terminal 34 is extended beyond the terminal 39 in the course of its inward evolution.

In the device of Fig. 5, the predetermined or certain override distance is to be determined in the same manner as described in view of Fig. 4, with the difference that it must be assumed that the slot 44 is wide enough to permit the arm 42 and its projection 46 to follow the inwardly curving convolutions to the fullest extent just as the length of the slot 37 must be sufficient to permit the ball 39 to follow the inner convolutions to abut the end 34.

The predetermined override provided by the embodiments of Figs. 7 and 9, is the excess in the angular length of the notch 56 (or the distance between pins 57a and 58a) over the angular distance across the lug 59 and the pin 54 (or across the pins 54a and 59a).

The various advantages and objects of the invention may be accomplished by modifications of the particular embodiment specifically described herein, and it is intended that the appended claims shall include all equivalent arrangements fairly coming within their call.

Having thus described my invention, what I claim as new and desire to protect by Letters Patent is:

1. In a swivel joint, a pair of relatively rotatable members and stop means permitting relative movement of said members with a predetermined amount of override beyond one complete revolution, said stop means comprising the provision in one of said members of an arcuate groove extending concentrically of its turning axis a predetermined distance and less than 360 degrees, the companion swivel member having formed thereon a complementary groove aligned concentrically with said first-mentioned groove and of a length greater than the angular distance between the terminal ends of said first-mentioned groove and a stop element disposed to move in said groove responsive to turning movement of said swivel members and movable into position at either end of the companion groove for stopping engagement with a terminal end of said first-mentioned groove when said swivel members are turned beyond 360 degrees in either direction.

2. In a swivel joint, a pair of swivel members assembled for relative turning movement, and stop means arranged to permit movement of said members a predetermined amount beyond 360 degrees, said stop means comprising the provision in an axial end of a first one of said swivel members of a guideway extending concentrically with the axis of rotation of said member an angular distance of less than 360 degrees, said guideway having opposite terminal ends in relatively close proximity, the companion swivel member having a second arcuate guideway formed in its axial end confronting said first-mentioned guideway in assembled relation, said second arcuate guideway being of a length greater than the distance separating the terminal ends of said first-mentioned guideway, and a movable stopping element in the nature of a ball disposed in said guideways when said swivel members are in assembled relation, said ball shifting to opposite ends of the second guideway for stopping engagement with one or the other of the terminal ends of the first-mentioned guideway when said members are turned relatively beyond 360 degrees.

3. In a swivel joint, a pair of relatively rotatable swivel members and means for limiting the rotative movement thereof so as to permit displacement with an override beyond 360 degrees, said stop means comprising the provision in a first one of said swivel members of a spiral groove evolved with respect to the center of rotation of said members such that opposite ends of said groove are displaced with respect to each other in a direction about said center by a predetermined length of arc, the companion swivel member having formed therein a radially extending groove leading from the end of the outermost convolution of the spiral groove at least into the next adjoining convolution of the spiral groove, and a movable stop element disposed in said radially extending groove and the spiral groove and movable back and forth in a radial direction to follow said spiral consequent upon relative rotation of said swivel members, said movable element being fully disposed in said next adjoining convolution from the outer convolution or vice versa upon the completion of 360 degrees displacement of said members, the extent of said override thereafter being determined by the angular distance remaining between the innermost end of the spiral groove and said movable stop element at the time the latter is fully moved into said next adjoining convolution as aforesaid.

4. In a swivel joint, a pair of relatively rotatable swivel members and means for limiting the swivel movement thereof comprising the formation in the axial end of one of said members of a spiral groove evolved with respect to the center of rotation of said member and having an inner terminal which extends a predetermined amount in the direction of evolution toward said center beyond the outer terminal thereof, the companion swivel member having formed in the axial end thereof confronting said first-mentioned member a radially extending groove of a length to communicate from said outer terminal of the spiral groove at least fully into the next adjoining convolution of said spiral groove, and a ball disposed in both grooves when said members are in assembled relation, said ball being adapted to shift to opposite ends of the radial groove responsive to rotatable movement of said members so as to be in position to engage one or the other terminals of said spiral groove to arrest rotative movement of the members after turning beyond 360 degrees from either arrested position.

5. In a swivel joint, a pair of relatively rotatable swivel members and stop means arranged to limit the rotative movement thereof to a predetermined number of revolutions or fractions thereof, said stop means comprising the provision in one axial end of a first one of said swivel members of a spiral groove evolved with respect to the turning axis of said members, said groove having outer and inner terminal ends and the inner terminal extending a predetermined angular distance toward the center of evolution beyond the outer terminal, a level pivoted on the confronting axial end of the companion swivel member with an eccentric portion arranged for movement back and forth in a direction generally toward said center, when the lever is pivoted, from a position in alignment with said outer terminal to a position in alignment at least with the next adjoining convolution, and means constituting a stop on said eccentric portion of the lever and disposed in said spiral groove to follow the same and effect movement of said lever in one or the other direction when said swivel members are turned in either direction whereby to dispose said stop in a position for stopping engagement with one or the other terminals of said spiral groove.

6. In a swivel joint, coacting swivel members movable coaxially one with respect to the other, each swivel member having one face abutting a like face of the other swivel member, a substantially annular groove formed in the abutting face of one of said swivel members with the ends of said groove spaced with respect to each other, a corresponding groove formed in the abutting face of the other swivel member and adapted to communicate with the spaced ends of the substantially annular groove aforesaid, and a movable element disposed in said grooves whereby the movement of one of said swivel members may be limited with respect to the other swivel member.

PAUL H. IRMISCHER.